US010261206B2

(12) United States Patent
Liu et al.

(10) Patent No.: US 10,261,206 B2
(45) Date of Patent: Apr. 16, 2019

(54) GAUSSIAN BEAM MIGRATION IMAGING METHOD AND DEVICE

(71) Applicant: INSTITUTE OF GEOLOGY AND GEOPHYSICS, CHINESE ACADEMY OF SCIENCES, Beijing (CN)

(72) Inventors: Peng Liu, Beijing (CN); Yanfei Wang, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 37 days.

(21) Appl. No.: 15/809,660

(22) Filed: Nov. 10, 2017

(65) Prior Publication Data

US 2018/0188398 A1    Jul. 5, 2018

(30) Foreign Application Priority Data

Dec. 30, 2016  (CN) .......................... 2016 1 1265432

(51) Int. Cl.
*G01V 1/28*    (2006.01)
*G01V 1/34*    (2006.01)
*G06F 17/10*   (2006.01)

(52) U.S. Cl.
CPC ............... *G01V 1/34* (2013.01); *G01V 1/282* (2013.01); *G06F 17/10* (2013.01); *G01V 2210/51* (2013.01)

(58) Field of Classification Search
CPC ........ G01V 1/286; G01V 1/003; G01V 1/301; G01V 1/28; G01V 2210/51; G01V 1/364; G01V 2210/671; G01V 2210/522
See application file for complete search history.

(56) References Cited

U.S. PATENT DOCUMENTS 5,235,555 A * 8/1993 Albertin ................. G01V 1/301
                                                  367/50
5,260,911 A * 11/1993 Mason .................... G01V 1/286
                                                  367/57

(Continued)

FOREIGN PATENT DOCUMENTS

CN      10173836 A     6/2010
CN     102116870 A     7/2011
           (Continued)

OTHER PUBLICATIONS

Thamban et al., "The Trade-Off between Regularity and Stability in Tikhonov Regularization", Jan. 1997, Mathematics and Computation, vol. 66, No. 217, pp. 193-206.*

(Continued)

*Primary Examiner* — Mischita L Henson

(57) ABSTRACT

Techniques for Gaussian beam migration imaging are described herein. According to some aspects, a seismic wave field of an earth surface is represented in the form of superposition of Gaussian beams with a present curvature parameter in a time-space domain. A width of the Gaussian beam based function and a spacing between centers of adjacent Gaussian beams of the seismic wave field of the earth surface are set as a preset width and spacing, respectively. A decomposition model is established according to the set seismic wave field. An optimization solution algorithm is applied, based on seismic data and a medium velocity model, to the decomposition model to obtain multiple waveform functions. Gaussian beams corresponding to the multiple waveform functions are propagated, based on the medium velocity model. Migration imaging is performed to obtain migration imaging results.

8 Claims, 7 Drawing Sheets

(56) References Cited

U.S. PATENT DOCUMENTS

| | | | | |
|---|---|---|---|---|
| 5,274,605 | A * | 12/1993 | Hill | G01V 1/301 367/50 |
| 8,060,312 | B2 * | 11/2011 | Wang | G01V 1/28 702/14 |
| 2009/0248313 | A1 * | 10/2009 | Berkovitch | G01V 1/28 702/16 |
| 2014/0293744 | A1 * | 10/2014 | Zhang | G01V 1/28 367/53 |

FOREIGN PATENT DOCUMENTS

| | | |
|---|---|---|
| CN | 103995288 A | 8/2014 |
| CN | 104749623 A | 7/2015 |

OTHER PUBLICATIONS

"First Office Action".
"First Search Report".
"Supplementary Search Report".
"Translation of First Office Action".
Nair, et al., "The Trade-Off Between Regularity and Stability in Tikhonov Regularization", Mathematics of Computation, vol. 66, No. 217, Jan. 1, 1997, 1903-206.

\* cited by examiner

GAUSSIAN BEAM MIGRATION IMAGING METHOD AND DEVICE

This application claims benefit of Application No. 201611265432.0, filed on Dec. 30, 2016 in China and which application is incorporated herein by reference. A claim of priority is made.

TECHNICAL FIELD

The present invention relates to the field of seismic exploration data processing, and particularly to a Gaussian beam migration imaging method and device.

BACKGROUND ART

As the society develops and of people's life improves, the demands for oil and gas resources are increasing. Thus, it is necessary to accelerate the exploration of the oil and gas resources in complex geological structure areas. Seismic imaging is a significant part of seismic exploration, and the improvement of the computational efficiency of the migration imaging technologies will be of great significance to the oil-gas exploration.

Gaussian beam migration has been widely applied to the migration imaging. The Gaussian beam migration has advantages of Kirchhoff migration, such as efficiency and steep dip imaging, and it also makes it easy to deal with problems such as caustics and multi-valued travel time. It is proved by practice that the Gaussian beam migration is an excellent migration technology. Hill has given specific implementation of representing plane waves by Gaussian beams and of the Gaussian beam migration, which lays a foundation for the Gaussian beam migration. Thereafter, scientific researchers did a lot of extending studies on the Gaussian beam migration, such as anisotropic Gaussian beam migration, true-amplitude Gaussian beam migration, Gaussian beam reverse migration, dynamically focused Gaussian beam migration and sparse Gaussian beam migration.

The Gaussian beam migration includes three steps: decomposing seismic data and representing the seismic data with Gaussian beams; propagating the Gaussian beams downward; and superposing, according to an imaging condition, contributions of the Gaussian beams at an imaging point. The decomposing the seismic data and representing the seismic data with Gaussian beams is the key factor for the Gaussian beam migration, which decides the computation amount and imaging results of the migration.

In the existing sparse Gaussian beam migration imaging methods, sparse decomposition is applied to the seismic data by using Gaussian beams with a curvature of zero. But the seismic data has a curvature, and therefore, both a width of a Gaussian beam based function and a spacing between centers of two adjacent Gaussian beams should be small enough to enable appropriate fitting of the seismic data. However, in the existing Gaussian beam migration imaging methods, a large number of waveform functions are obtained through decomposition, and it is required to perform migration imaging on each of the waveform functions during the migration of seismic imaging, and thus the computational efficiency of the entire migration is low.

DISCLOSURE OF THE INVENTION

In view of this, embodiments of the present invention provide a Gaussian beam migration imaging method and device. With such method and device, the seismic data are decomposed by using time-space domain Gaussian beams with a non-zero preset curvature parameter. Thereby, compared with the existing methods, the width of the Gaussian beam based function can be appropriately increased, and the spacing between the centers of two adjacent Gaussian beams can also be increased. Thus, compared with the existing methods, the quantity of waveform functions obtained through decomposition can be reduced, which improves the computational efficiency of the migration.

To achieve the above purpose, the present invention adopts technical solutions as follows.

A Gaussian beam migration imaging method is provided. The method includes: representing a seismic wave field of an earth surface in a form of superposition of Gaussian beams with a preset curvature parameter in time-space domain, where the representation of the seismic wave field of the earth surface includes a waveform function and a time-space domain Gaussian beam based function; setting a width of a Gaussian beam based function of the seismic wave field of the earth surface as a preset width, and setting a spacing between centers of adjacent Gaussian beams of the seismic wave field of the earth surface as a preset spacing, so as to obtain a set seismic wave field of the earth surface; establishing, according to the set seismic wave field of the earth surface, a decomposition model for the seismic wave field of the earth surface; applying, based on seismic data and a medium velocity model, an optimization solution algorithm to the decomposition model for the seismic wave field of the earth surface, so as to obtain a plurality of waveform functions corresponding to the seismic data; and propagating, based on the medium velocity model, Gaussian beams corresponding to the plurality of waveform functions, and performing migration imaging to obtain migration imaging results.

A Gaussian beam migration imaging device is further provided. The device includes a seismic wave field setting module, a parameter setting module, a model establishing module, a model solving module and a migration imaging module. The seismic wave field setting module is configured to represent a seismic wave field of an earth surface in a form of superposition of Gaussian beams with a preset curvature parameter in time-space domain, where the representation of the seismic wave field of the earth surface includes a waveform function and a time-space domain Gaussian beam based function. The parameter setting module is configured to set a width of a Gaussian beam based function of the seismic wave field of the earth surface as a preset width, and set a spacing between centers of adjacent Gaussian beams of the seismic wave field of the earth surface as a preset spacing, so as to obtain a set seismic wave field of the earth surface. The model establishing module is configured to establish, according to the set seismic wave field of the earth surface, a decomposition model for the seismic wave field of the earth surface. The model solving module is configured to applying, based on seismic data and a medium velocity model, an optimization solution algorithm to the decomposition model for the seismic wave field of the earth surface, so as to obtain a plurality of waveform functions corresponding to the seismic data. The migration imaging module is configured to propagate, based on the medium velocity model, Gaussian beams corresponding to the plurality of waveform functions, and perform migration imaging to obtain migration imaging results.

With the Gaussian beam migration imaging method and device provided by the embodiments of the present invention, the seismic wave field of the earth surface is represented in the form of superposition of Gaussian beams with a preset curvature parameter in time-space domain. Thereby, the width of the Gaussian beam based function can be set as a preset width, the spacing between centers of adjacent Gaussian beams can be set as a preset spacing, and the decomposition model for the seismic wave field of the earth surface can be established according to the set seismic wave field of the earth surface. Thus, in such solution, both the preset width and the preset spacing can be increased with respect to the prior art, so that the quantity of waveform functions obtained through solution on this model is reduced with respect to the existing methods, and thus the Gaussian beams required for migration imaging are reduced, which improves the computational efficiency of migration imaging.

To make the above purpose, features and advantages of the present invention more apparent and understandable, preferred embodiments are provided and described in detail below in conjunction with the drawings.

BRIEF DESCRIPTION OF DRAWINGS

To make the purpose, technical solutions and advantages of embodiments of the present invention more clear, technical solutions of the embodiments of the present invention will be clearly and completely described below, in conjunction with the drawings used in the embodiments of the present invention. Apparently, the embodiments described are some, but not all of the embodiments of the present invention. Any other embodiments, obtained by those skilled in the art based on the embodiments of the invention without paying any creative efforts, would fall within the scope of protection of the invention.

DETAILED DESCRIPTION OF EMBODIMENTS

The technical solutions of the embodiments of the present invention will be described clearly and completely below, in conjunction with drawings used in the embodiments of the present invention. Apparently, some but not all of the embodiments of the present invention are described. Generally, components of the embodiments of the present invention, as described and shown in the figures herein, may be arranged and designed in different configurations. Hence, the detail description of the embodiments of the present invention provided in the figures hereinafter is not intended to limit the scope of protection of the present invention, but is merely illustrative of the selected embodiments of the present invention. Any other embodiments, obtained by those skilled in the art based on the embodiments of the present invention without paying any creative efforts, would fall within the scope of protection of the invention.

It shall be noted that similar numbers and letters refer to similar items in the following figures. Therefore, once an item has been defined in one figure, it will not be further defined or explained in the subsequent figures. In addition, in the description of the present invention, the terms such as "first" and "second" are only for the purpose of differentiation, and cannot be considered indicating or implying relative importance.

Figure 1:
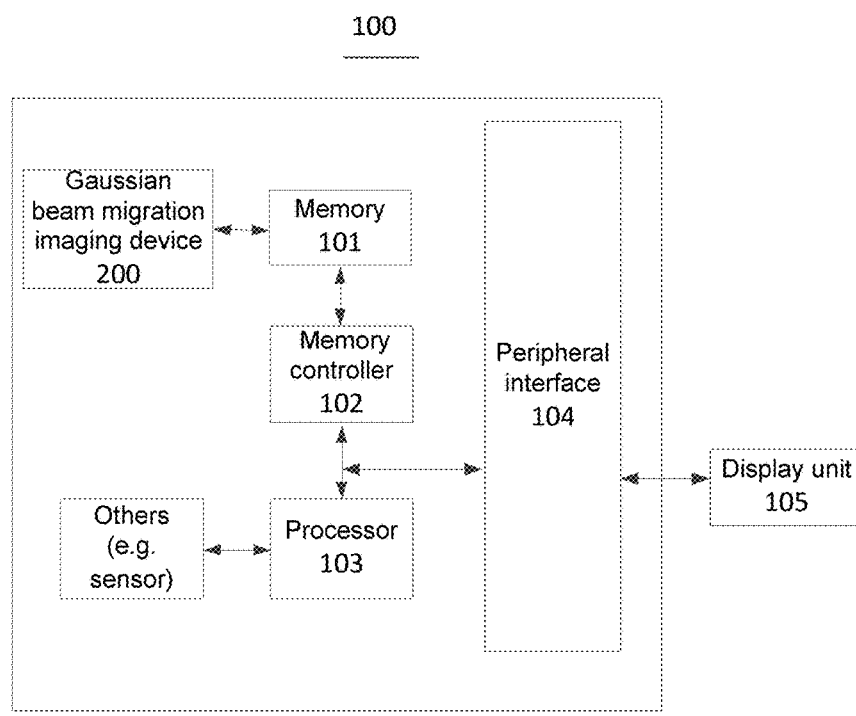
FIG. 1 shows a schematic diagram showing the structure of a user terminal provided by an embodiment of the present invention.

As shown in FIG. 1, a schematic block diagram of a computer 100 provided by an embodiment of the present application is shown. The computer 100 includes a Gaussian beam migration imaging device 200, a memory 101, a memory controller 102, a processor 103, a peripheral interface 104, a display unit 105 and others.

These elements, i.e. the memory 101, the memory controller 102, the processor 103, the peripheral interface 104 and the display unit 105, are electrically connected with each other directly or indirectly, to enable data transmission or interaction. For example, these elements may be electrically connected with each other via one or more communication buses or signal lines. The Gaussian beam migration imaging device 200 includes at least one software function module that is storable in the memory 101 or fixed in an operating system (OS) of the computer 100 in a form of software or firmware. The processor 103 is configured to execute executable modules stored in the memory 101, e.g. the software function modules included in the Gaussian beam migration imaging device 200 or computer programs.

Here, the memory 101 may be, but not limited to, a random access memory (RAM), a read only memory (ROM), a programmable read-only memory (PROM), an erasable programmable read-only memory (EPROM), an electric erasable programmable read-only memory (EEPROM) and the like. Here, the memory 101 is configured to store programs. The processor 103 executes the programs upon receiving an execution instruction. The method executed by the computer 100 as defined by the flow process revealed by any of the aforementioned embodiments of the present invention may be applied in the processor 103 or implemented by the processor 103.

The processor 103 may be an integrated circuit chip capable of processing signals. The above processor 103 may be a general-purpose processor, including a central processing unit (CPU for short), a network processor (NP for short) and the like; and the processor may also be a digital signal processor (DSP), an application-specific integrated circuit (ASIC), a field-programmable gate array (FPGA) or other programmable logic devices, discrete gates or transistor logic devices and discrete hardware assembly. It may implement or execute various methods, steps and logic block diagrams disclosed in the embodiments of the present invention. The general-purpose processor may be a microprocessor, or the processor 103 may also be any conventional processor.

The peripheral interface 104 couples various input/output devices to the processor 103 and the memory 101. In some embodiments, the peripheral interface 104, the processor 103 and the memory controller 102 may be implemented in a single chip. In some other embodiments, the peripheral interface, the processor and the memory controller may be implemented by separate chips.

The display unit 105 provides an interactive interface (e.g. a user operating interface) between the computer 100 and a user, or is configured to display image data to the user for reference. In the present embodiment, the display unit 105 may be a liquid crystal display or a touch-control display. In the case of the touch-control display, the display unit may be for example a capacitive touch screen or a resistive touch screen supporting single-point or multi-point touch operations. Supporting single-point or multi-point touch operations mean that the touch-control display can sense touch operation(s) simultaneously occurring at one or more positions of the touch-control display, and send the sensed touch operations to the processor 103 for computation and processing.

It is appreciated that the structure shown in FIG. 1 is schematic only, and the computer 100 may also include more or less components than those shown in FIG. 1 or have a different configuration from that shown in FIG. 1. The various components shown in FIG. 1 may be implemented by hardware, software or a combination thereof.

Figure 2:
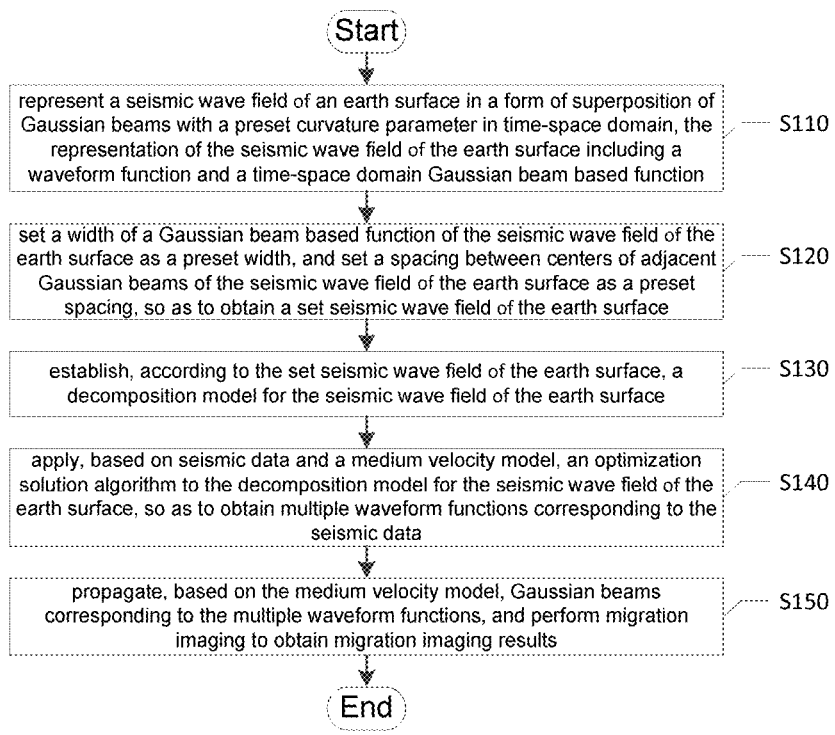
FIG. 2 shows a flow chart of a Gaussian beam migration imaging method provided by an embodiment of the present invention.

An embodiment of the present invention provides a Gaussian beam migration imaging method, which reduces, by reducing the quantity of waveform functions obtained through solution, the quantity of Gaussian beams used for migration imaging, so as to improve computational efficiency of migration imaging. Referring to FIG. 2, the method includes the following steps S110 to S150.

In step S110, a seismic wave field of an earth surface is represented in a form of superposition of Gaussian beams with a preset curvature parameter in time-space domain, where the representation of the seismic wave field of the earth surface includes a waveform function and a time-space domain Gaussian beam based function.

Figure 3:
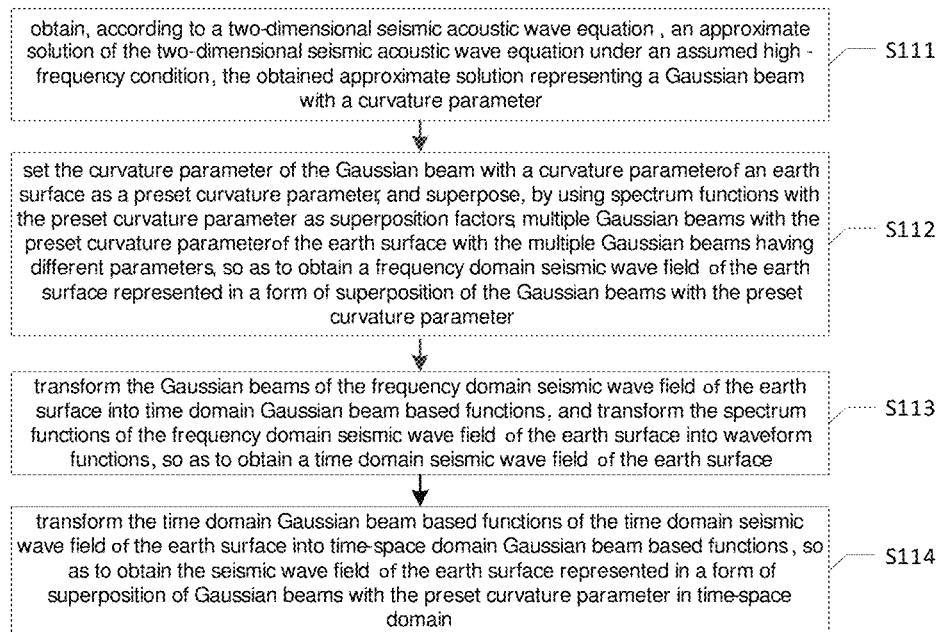
FIG. 3 shows a flow chart of step S110 in the Gaussian beam migration imaging method provided by the embodiment of the present invention.

Specifically, as shown in FIG. 3, step S110 includes the following steps S111 to S114.

In step S111, according to a two-dimensional seismic acoustic wave equation, an approximate solution of the two-dimensional seismic acoustic wave equation is obtained under an assumed high-frequency condition, the obtained approximate solution representing a Gaussian beam with a curvature parameter.

The two-dimensional seismic acoustic wave equation may be expressed as:

$$\nabla^2 u(x, z, \omega) + \frac{\omega^2}{V^2(x, z)} u(x, z, \omega) = 0,$$

where v(x, z) represents the velocity of a medium model, $\omega$ represents an angular frequency, and u(x, z, $\omega$) represents a frequency domain seismic wave field.

An approximate solution $u^{gb}(s, n, \omega)$ of the two-dimensional seismic acoustic wave equation, which is obtained under the assumed high-frequency condition, may be expressed as:

$$u^{gb}(s, n, \omega) = \left[\frac{Q(s_0)}{v(s_0)} \frac{v(s)}{Q(s)}\right]^{1/2} \exp\left[i\omega\left(\tau(s) + \frac{1}{2}M(s)n^2\right)\right],$$

where the approximate solution represents a Gaussian beam with a curvature parameter.

Here, the variable s represents path length along a central ray, functions $\tau(s)$ and $v(s)$ represent the travel time and the velocity along the central ray, respectively, and (s, n) constitutes a ray-centered coordinate system. A complex valued function M(s)=P(s)/Q(s) is a second order partial derivative of the travel time, and it is required that Im(M(s))>0, and K(s)=v(s)Re(M(s)) is referred to as a wave-front curvature of the Gaussian beam. The central ray and the travel time are calculated by a ray tracing equation set, and complex functions P(s) and Q(s) are calculated by a dynamics tracing equation set, and |Q(s)|≠0.

In step S112, the curvature parameter of the Gaussian beam with a curvature parameter of the earth surface is set as a preset curvature parameter, and by using spectrum functions with the preset curvature parameter as superposition factors, multiple Gaussian beams with the preset curvature parameter of the earth surface are superposed, with the multiple Gaussian beams having different parameters, so as to obtain a frequency domain seismic wave field of the earth surface represented in a form of superposition of the Gaussian beams with the preset curvature parameter.

The seismic wave field has a certain curvature, and initial values are given as follows:

$$P(s_0) = \frac{K(s_0)\omega_r w_0^2}{v^2(s_0)} + \frac{i}{v(s_0)}, \quad Q(s_0) = \frac{\omega_r w_0^2}{v(s_0)},$$

the initial values are used for the preset curvature parameter, and the curvature parameter of the Gaussian beam of the earth surface is the preset curvature parameter. The preset curvature parameter is not zero, so that each of the Gaussian beams of the earth surface has a curvature corresponding to the preset curvature parameter.

At the earth surface, an emission position of the central ray is represented as $x_m = am$, where m=1, 2, ..., M and a represents the spacing between centers of two adjacent beams.

By using spectrum functions $B_{mnlj}(\omega)$ with the preset curvature parameter as superposition factors, multiple Gaussian beams with a non-zero curvature parameter are superposed with the multiple Gaussian beams having different parameters. Specifically, the different parameters include different positive integers M, different inclination directions N, different curvatures L, and different time delays J. The obtained frequency domain seismic wave field u(x, z, $\omega$) is expressed as:

$$u(x, z, \omega) = \sum_{m=1}^{M} \sum_{n=1}^{N} \sum_{l=1}^{L} \sum_{j=1}^{J} B_{mnlj}(\omega) u_{mnlj}^{gb}(x, z, \omega).$$

The curvature parameter of the Gaussian beam of the earth surface (z=0), which is substituted into the frequency domain seismic wave field, is the preset curvature parameter, and the frequency domain seismic wave field of the earth surface represented in the form of superposition of the Gaussian beams with the preset curvature parameter is obtained.

In step S113, the Gaussian beams of the frequency domain seismic wave field of the earth surface are transformed into time domain Gaussian beam based functions, and the spectrum functions of the frequency domain seismic wave field of the earth surface are transformed into waveform functions, so as to obtain a time domain seismic wave field of the earth surface.

Specifically, step S113 includes: substituting a coordinate $n=(x-x_m)\cos\theta$ of the ray-centered coordinate system of the earth surface (z=0) into the Gaussian beams of the frequency domain seismic wave field of the earth surface $u(x, z, \omega)$, so as to obtain the seismic wave field of the earth surface represented in a form of superposition of frequency domain Gaussian beam based functions; and applying an inverse Fourier transform to the frequency domain Gaussian beam based functions to obtain time domain Gaussian beam based functions $\tilde{\psi}(x,t;x_m,t_j,\theta_n,K_l)$, where $t_j$ represents the time delay, $\theta_n$ represents the inclination direction and $K_l$ represents the curvature. The inverse Fourier transform is applied to the spectrum functions $B_{mnlj}(\omega)$ to obtain waveform functions $B_{mnlj}(t)$, so as to obtain a time domain seismic wave field of the earth surface $u(x,z=0,t)$ as follows:

$$u(x, z=0, t) = \sum_{m=1}^{M}\sum_{n=1}^{N}\sum_{l=1}^{L}\sum_{j=1}^{J} B_{mnlj}(t) * \tilde{\Psi}(x, t; x_m, t_j, \theta_n, K_l).$$

In step S114, the time domain Gaussian beam based functions of the time domain seismic wave field of the earth surface are transformed into a time-space domain Gaussian beam based functions, so as to obtain a seismic wave field of the earth surface represented in a form of superposition of the Gaussian beams with the preset curvature parameter in time-space domain.

Figure 4:
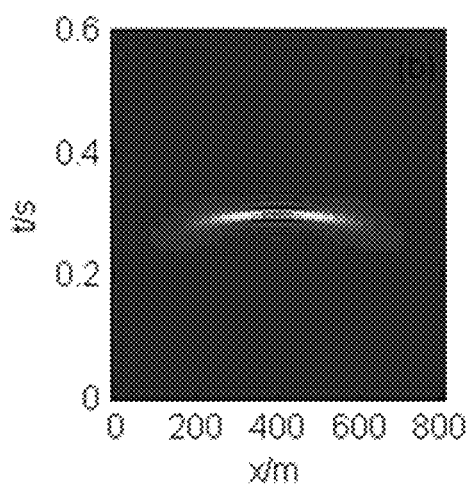
FIG. 4 shows a schematic diagram of a time-space domain Gaussian beam based function provided by the embodiment of the present invention.

If the inclination $|\theta|$ is approximate to 90 degrees, the time domain Gaussian beam based function $\tilde{\psi}(x,t;x_m,t_j,\theta_n,k_l)$ would be too wide. In order to make the width of the Gaussian beam based function not change with the inclination, $w_0/\cos\theta$ is replaced with a constant w, to obtain a time-space domain Gaussian beam based function $\psi(x,t;x_m,t_j,\theta_n,K_l)$. As shown in FIG. 4, a Gaussian beam based function with an inclination of zero and a non-zero curvature is shown, which is expressed as follows:

$$\Psi(x, t; x_m, t_j, \theta_n, K_l) = \exp[i\omega T_R] IFT\left[\exp\left(-\left|\frac{\omega}{\omega_r}\right|\frac{(x-x_m)^2}{2w^2}\right)\right],$$

$$T_R = t_j + \frac{\sin\theta_n}{V}(x-x_m) + \frac{1}{2}\frac{K_l}{V}(x-x_m)^2\cos^2\theta_n,$$

where IFT[·] represents the inverse Fourier transform. In addition, the acquired seismic data have a bandwidth, e.g. $0<\omega_l\leq|\omega|\leq\omega_h<2\pi f_{Nyquist}$, where $\omega_l$ and $\omega_h$ are a minimum angular frequency and a maximum angular frequency of the seismic data, respectively, and $f_{Nyquist}$ is the Nyquist frequency.

The time domain Gaussian beam based function $\tilde{\psi}(x,t;x_m,t_j,\theta_n,K_l)$, of the time domain seismic wave field of the earth surface is replaced with the time-space domain Gaussian beam based function $\psi(x,t;x_m,t_j,\theta_n,K_l)$, and thus the seismic wave field of the earth surface $u(x,z=0,t)$ represented in the form of superposition of the Gaussian beams with the preset curvature parameter in time-space domain is obtained, which is expressed as follow:

$$u(x,z=0,t)=\Sigma_\gamma B_\gamma(t)*\omega_\gamma(x,t),$$

where γ represents the set of parameters $x_m$, $t_j$, $\theta_n$, $K_l$, $B_\gamma(t)$ is short for $B_{mnlj}(t)$, and $\omega_\gamma(x, t)$ is short for $\psi(x,t;x_m,t_j,\theta_n,K_l)$.

In step S120, the width of the Gaussian beam based function of the seismic wave field of the earth surface is set as a preset width, and the spacing between centers of adjacent Gaussian beams of the seismic wave field of the earth surface is set as a preset spacing, so as to obtain a set seismic wave field of the earth surface.

In the present embodiment, the preset width is increased, with respect to the width of the Gaussian beam based function under a zero curvature in the prior art; and likewise, the preset spacing is increased, with respect to the spacing between centers of adjacent Gaussian beams under a zero curvature in the prior art. Specifically, the preset width may be 1.5 times of the width of the Gaussian beam based function under a zero curvature in the prior art, and the preset spacing may be 1.5 times of the spacing between the centers of adjacent Gaussian beams under a zero curvature in the prior art. The width of the Gaussian beam based function of the seismic wave field of the earth surface is set as the preset width w, and the spacing between the centers of adjacent Gaussian beams of the seismic wave field of the earth surface is set as the preset spacing a, which are expressed as follows:

$$w = \frac{3\pi V_a}{\omega_l}, \quad a = 3w\sqrt{\frac{\omega_l}{\omega_h}}.$$

Thus, the set seismic wave field of the earth surface $u(x,z=0,t)$ is obtained and expressed as:

$$u(x,z=0,t)=\Sigma_\gamma B_\gamma(t)*\psi'_\gamma(x,t)$$

In step S130, according to the set seismic wave field of the earth surface, a decomposition model is established for the seismic wave field of the earth surface.

According to the set seismic wave field of the earth surface $u(x,z=0,t)=\Sigma_\gamma B_\gamma(t)*\psi'_\gamma(x,t)$, the decomposition model for the seismic wave field of the earth surface is established. The decomposition model for the seismic wave field of the earth surface is represented as:

$$d=Ac,$$

where the vector d and the matrix A are constituted by seismic data and Gaussian beam based functions, respectively, and the vector c is constituted by waveform functions.

In step S140, based on seismic data and a medium velocity model, an optimization solution algorithm is applied to the decomposition model for the seismic wave field of the earth surface, so as to obtain multiple waveform functions corresponding to the seismic data.

Figure 5:
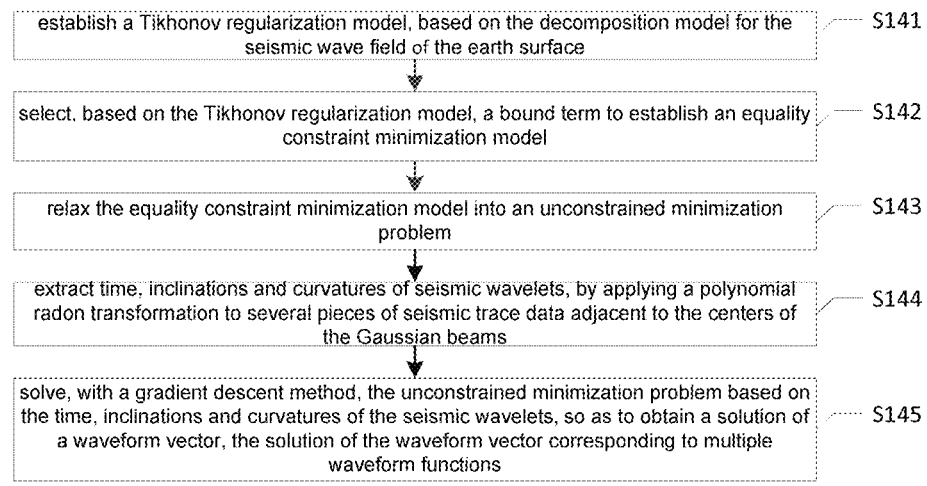
FIG. 5 shows a flow chart of step S140 in the Gaussian beam migration imaging method provided by the embodiment of the present invention.

Referring to FIG. 5, specifically, step S140 includes the following steps S141 to S145.

In step S141, a Tikhonov regularization model is established based on the decomposition model for the seismic wave field of the earth surface.

For the decomposition model for the seismic wave field of the earth surface d=Ac, a suitable inversion model is required for solving the vector c. Therefore, the Tikhonov regularization model is established based on the decomposition model for the seismic wave field of the earth surface, which is expressed as:

$$J^v(c) := \frac{1}{2}\|Ac - d\|_{l_2}^2 + v\Omega(c),$$

where $\Omega(c)$ represents a stable factor, and $v>0$ represents a regularization parameter.

In step S142, based on the Tikhonov regularization model, a bound term is selected to establish an equality constraint minimization model.

An $l_0$ norm is selected for the bound term $\Omega(c)$ based on the Tikhonov regularization model, and thus the equality constraint minimization model is established:

$$\|c\|_{l_0} \to \min, s.t. Ac=d.$$

In step S143, the equality constraint minimization model is relaxed into an unconstrained minimization problem.

The equality constraint minimization model is relaxed, and thus an unconstrained minimization problem is obtained, which is expressed as:

$$\tilde{c} = \underset{c}{\operatorname{argmin}} \lambda \|c\|_{l_0} + \frac{1}{2}\|Ac - d\|_{l_2}^2,$$

Where $\lambda$ is a Lagrangian multiplier and $\lambda \geq 0$, $\|\cdot\|_{l_0}$ is defined as $$\|v\|_{l_0} = \lim_{p \to 0} \|v\|_{l_p} = \lim_{p \to 0} \left( \sum_i |v_i|^p \right)^{\frac{1}{p}}$$

and $0^0=0$. We may simply define the $l_0$ norm as $\|v\|_{l_0} = \{\text{num}(v \neq 0), \text{ for all } v \in \mathbb{R}^N\}$ in which $\text{num}(v \neq 0)$ represents a cardinal number of the vector v, and it is require that $\|c\|_{l_0}$ is the minimum, that is, the number of non-zero values of the vector c is the minimum.

In step S144, time, inclinations and curvatures of seismic wavelets are extracted, by applying a polynomial radon transformation to several pieces of seismic trace data adjacent to the centers of the Gaussian beams.

It can be concluded from the unconstrained minimization problem that it is impossible to directly obtain the non-zero values of a vector, while requiring the number of the non-zero values to be the minimum. Seismic wavelets reflected or diffracted from the underground have time and directional characteristics. Therefore, the time, inclinations and curvatures of the seismic wavelets can be extracted by applying a polynomial radon transformation to several pieces of seismic trace data adjacent to the centers of the Gaussian beams. Here, the polynomial radon transformation is expressed as:

$$R(\tau, p, q) = \int_{-\infty}^{\infty} d(t = \tau + p(x - x_m) + q(x - x_m)^2, x) dx.$$

The polynomial radon transformation corresponds to the expression of the time-space domain Gaussian beam based function $\psi(x, t; x_m, t_j, \theta_n, K_l)$, thus the following is obtained:

$$t_j = \tau, \theta_n = \arcsin(pV), K_l = \frac{2qV}{\cos^2\theta_n}.$$

Therefore, the time, inclination directions and curvatures of the seismic wavelets can be extracted. And based on the seismic data and the medium velocity model, the time, inclination direction and curvature of the specific seismic wavelet can be obtained.

In step S145, the unconstrained minimization problem is solved, with a gradient descent method, based on the time, inclinations and curvatures of the seismic wavelets, so as to obtain a solution of a waveform vector, the solution of the waveform vector corresponding to multiple waveform functions.

The number and locations of the non-zero values of vector C can be obtained based on the time, inclinations and curvatures of the seismic wavelets, and thus $\|c\|_{l_0} \to \min$ is achieved, thereby realizing the sparsification.

Then, the minimization problem in the unconstrained minimization problem is solved:

$$J(c) = \frac{1}{2}\|Ac - d\|_{l_2}^2 \to \min,$$

The vector c is calculated with the gradient descent method. According to the minimization problem, it is denoted by $g(c) = A^T(Ac - d)$.

A descent direction is defined as follows: $\tilde{d}(c) = -g(c) = A^Td - A^TAc$.

Iterative formulas for the gradient descent method are as follows:

$$\begin{cases} c_{l+1} = c_l + \alpha_l \tilde{d}_l, \\ \tilde{d}_l = -g(c_l), \\ \alpha_l = \underset{\alpha > 0}{\operatorname{argmin}} J[c_l + \alpha \tilde{d}_l], \end{cases}$$

where $J[c]$ is defined as $\|d - Ac\|^2$, and $d_l$ and $\alpha_l$ are a search direction and a step size along the search direction, respectively.

The Cauchy step size may be adopted as the step size along the search direction, that is:

$$\alpha_l^{Cauchy} = \frac{\|g(c_l)\|^2}{(g(c_l), Ag(c_l))}.$$

However, the use of the Cauchy step size will cause the step size along the search direction to be large, and thus cause each iteration along the gradient direction to be slow in terms of approaching the true solution.

Therefore, in the embodiment of the present invention, $\|g(c)\|$ and $J[c]$ are alternatively minimized along a straight line $y(c_n) = c_n - \alpha g(c_n)$, so that:

$$\alpha_n = \underset{\alpha > 0}{\operatorname{argmin}} \|g(y(c_n))\|; \text{ or } \alpha_n = \underset{\alpha > 0}{\operatorname{argmin}} J[y(c_n)].$$

In calculation, $$\alpha_n = \underset{\alpha > 0}{\operatorname{argmin}} \|g(y(c_n))\| \text{ and } \alpha_n = \underset{\alpha > 0}{\operatorname{argmin}} J[y(c_n)]$$

are used alternatively. Specifically, if n is odd, $$\alpha_n = \underset{\alpha>0}{\operatorname{argmin}} \|g(y(c_n))\|$$

is obtained according to $$\alpha_n = \underset{\alpha>0}{\operatorname{argmin}} \|g(y(c_n))\|;$$

and if n is even, $$\alpha_n = \frac{(g(c_n), Ag(c_n))}{(Ag(c_n), Ag(c_n))}$$

is obtained according to $$\alpha_n = \underset{\alpha>0}{\operatorname{argmin}} J[y(c_n)].$$

Thereby, the iterative formulas may be transformed into:

$$\begin{cases} g(c_n) = A^T(Ac_n - d), \\ \alpha_n = \frac{(g(c_n), g(c_n))}{(g(c_n), Ag(c_n))}, \text{ if } n \text{ is odd}, \\ \alpha_n = \frac{(g(c_n), Ag(c_n))}{(Ag(c_n), Ag(c_n))}, \text{ if } n \text{ is even}, \\ c_{n+1} = c_n - \alpha_n g(c_n). \end{cases}$$

Thereby, it is possible for the module of the gradient to progressively decrease as the iteration goes on, and it is possible to achieve a sufficient descent for the target function. When the module of the gradient approaches 0, the iteration ends.

The seismic data d(x, t) is substituted into the iterative formulas, and an initial value of the vector c (e.g. $c_0=0$) is given, thus the solution of the waveform vector c is obtained. The obtained solution of the waveform vector c corresponds to multiple waveform functions.

In the embodiments of the present invention, as the width of the Gaussian beam based function is set as 1.5 times of the width of the Gaussian beam based function in the prior art, and the spacing between the centers of adjacent Gaussian beams is set as 1.5 times of the spacing between the centers of adjacent Gaussian beams in the prior art, the quantity of the waveform functions obtained in the embodiments of the present invention is ⅔ of that of the waveform functions obtained in the prior art.

In step S150, Gaussian beams corresponding to the multiple waveform functions are propagated based on the medium velocity model, and migration imaging is performed to obtain migration imaging results.

Figure 6:
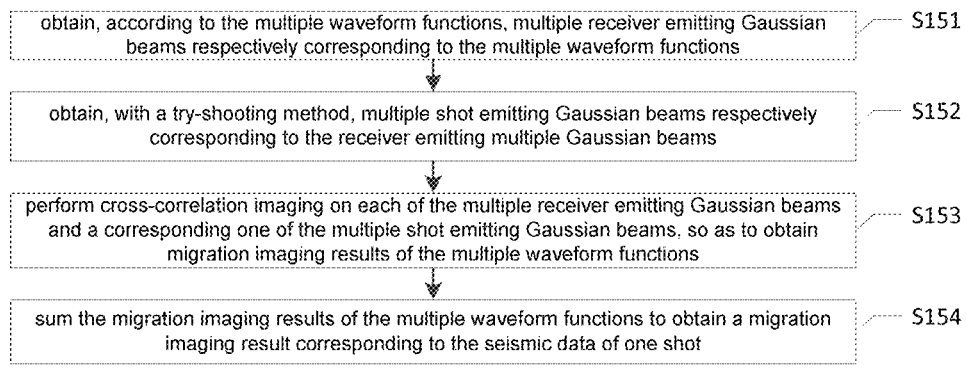
FIG. 6 shows a flow chart of step S150 in the Gaussian beam migration imaging method provided by the embodiment of the present invention.

Referring to FIG. 6, specifically, step S150 includes the following steps S151 to S154.

In step S151, according to the multiple waveform functions, multiple receiver emitting Gaussian beams respectively corresponding to the multiple waveform functions are obtained.

The receiver emitting Gaussian beams are constructed according to $u^{gb}$ (s,n,ω) as follows:

$$u^{gb}(s, n, \omega) = \left[\frac{Q(s_0)}{v(s_0)} \frac{v(s)}{Q(s)}\right]^{1/2} \exp\left[i\omega\left(\tau(s) + \frac{1}{2}M(s)n^2\right)\right].$$

Therefore, parameters including the travel time τ(s), P(s) and Q(s) along the central ray are required to be calculated, and the velocity v(s) along the central ray is calculated through an interpolation calculation of the medium velocity model.

The calculated parameters are substituted into $u^{gb}$ (s,n,ω) to obtain the Gaussian beams. The waveform functions and the Gaussian beam based functions are convoluted, so as to obtain amplitudes of the receiver emitting Gaussian beams based on the convolution results. The receiver emitting Gaussian beams are obtained according to $u^{gb}$(s,n,ω) and the obtained amplitudes of the receiver emitting Gaussian beams.

Specifically, traces of the central rays and the travel time along the central rays are obtained by solving the ray tracing equation set.

The ray tracing equation set is expressed as follows:

$$\frac{dx}{ds} = Vp_x, \quad \frac{dp_x}{ds} = -\frac{1}{V^2}\frac{\partial V}{\partial x}, \quad \frac{dT}{ds} = \frac{1}{V}.$$
$$\frac{dz}{ds} = Vp_z, \quad \frac{dp_z}{ds} = -\frac{1}{V^2}\frac{\partial V}{\partial z},$$

Initial parameters $x_0$, $z_0$, $p_{x0}$ and $p_{z0}$ are required for solving the ray tracing equation set.

According to an initial inclination θ of the waveform function, $$p_{x0} = \frac{\sin\theta}{V}, \quad p_{z0} = \frac{\cos\theta}{V}$$

will be obtained. The velocity is calculated by the interpolation calculation of the medium velocity model.

Thus, the central rays are calculated according to the ray tracing equation set. The calculated central rays include the traces of the central rays and the travel time along the central rays.

Then, the parameters P(s) and Q(s) are calculated along the central rays. P(s) and Q(s) are calculated according to a dynamic ray tracing equation set expressed as follow:

$$\frac{dQ(s)}{ds} = VP(s), \quad \frac{dP(s)}{ds} = -\frac{1}{V^2}\frac{\partial^2 V}{\partial n^2}Q(s).$$

Initial parameters $P(s_0)$ and $Q(s_0)$ are required for calculating the dynamic ray tracing equation set. And the $P(s_0)$ and $Q(s_0)$ can be calculated according to the initial width and the curvature of the waveform function.

Figure 7:
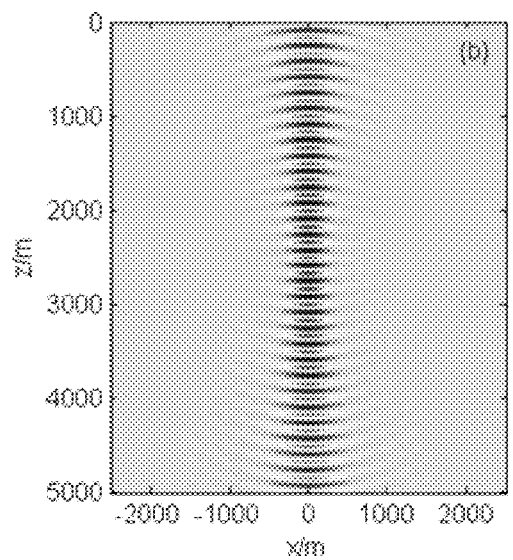
FIG. 7 shows a schematic diagram of propagation of Gaussian beams provided by the embodiment of the present invention.

Thereby, P(s) and Q(s) are calculated according to the dynamic ray tracing equation set. Then, the travel time τ(s), P(s), Q(s) along the central rays and the velocities v(s) along the central rays are substituted into $u^{gb}$(s,n,ω), to obtain Gaussian beams. Consequently, receiver emitting Gaussian beams are obtained according to the obtained Gaussian beams and the amplitudes of the receiver emitting Gaussian beams. As shown in FIG. 7, a schematic diagram of Gaussian beams with a non-zero initial curvature according to the embodiments of the present invention is shown.

In step S152, multiple shot emitting Gaussian beams respectively corresponding to the multiple receiver emitting Gaussian beams are obtained with a try-shooting method.

The construction of the shot emitting Gaussian beams are similar to that of the receiver emitting Gaussian beams described in step S151 except for the initial parameters, which will not be repeated here. In constructing the shot emitting Gaussian beams, the initial curvature is zero and the amplitudes of the shot emitting Gaussian beams are 1, and all that requires is to obtain the initial inclinations.

The initial inclinations can be obtained by the try-shooting method. Thereby, the shot emitting Gaussian beams can be constructed according to the method for constructing the receiver emitting Gaussian beams as described in step S151.

In step S153, cross-correlation imaging is performed on each of the multiple receiver emitting Gaussian beams and a corresponding one of the multiple shot emitting Gaussian beams, so as to obtain migration imaging results of the multiple waveform functions.

The Gaussian beam migration imaging is achieved under a cross-correlation imaging condition, which is expressed as:

$$W(x;x_s) = \int dt\, U^D(x,t;x_s) U(x,t)$$

where $x=(x,z)$ represents an imaging position, $x_s$ represents a position of the shot, $U_D(x,t,x_s)$ represents a positive propagation field emitted from the shot, and $U(x,t)$ represents a back propagation field emitted from the receiver.

$U_D(x,t,x_s)$ is approximately equal to Green's function and is calculated by superposing the shot emitting Gaussian beams, and $U(x,t)$ is obtained by superposing all the receiver emitting Gaussian beams.

Thereby, based on the receiver emitting Gaussian beams and the shot emitting Gaussian beams, the migration imaging can be performed according to the Gaussian beam migration imaging formula.

In step S154, the migration imaging results of the multiple waveform functions are summed to obtain a migration imaging result corresponding to the seismic data of one shot.

As the seismic data of one shot is subjected to sparse decomposition in step S140, the seismic data of one shot corresponds to multiple waveform functions obtained in step S140. Therefore, the migration imaging result corresponding to the seismic data of one shot is obtained by summing the migration imaging results of the multiple waveform functions corresponding to the seismic data of one shot.

The Gaussian beam migration imaging method further includes: summing the migration imaging results of the seismic data of all shots within a predetermined exploration area, to obtain an imaging result of the predetermined exploration area.

Figure 8:
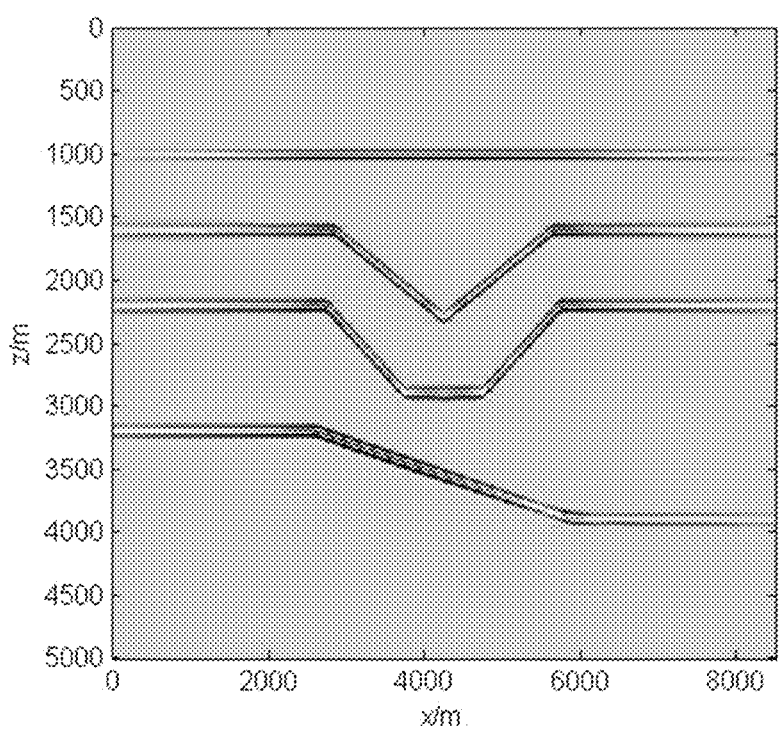
FIG. 8 shows a schematic diagram of Gaussian beam migration imaging results provided by the embodiment of the present invention.

Multiple shots are required for detecting an area to be explored, thereby seismic data of multiple shots are generated. In order to obtain the imaging result corresponding to a predetermined exploration area, it is required to sum the migration imaging results of all the seismic data within the predetermined exploration area, so as to obtain the imaging result corresponding to the predetermined exploration area. As shown in FIG. 8, a schematic diagram of the Gaussian beam migration imaging results obtained in the embodiment of the present invention is shown.

Figure 9:
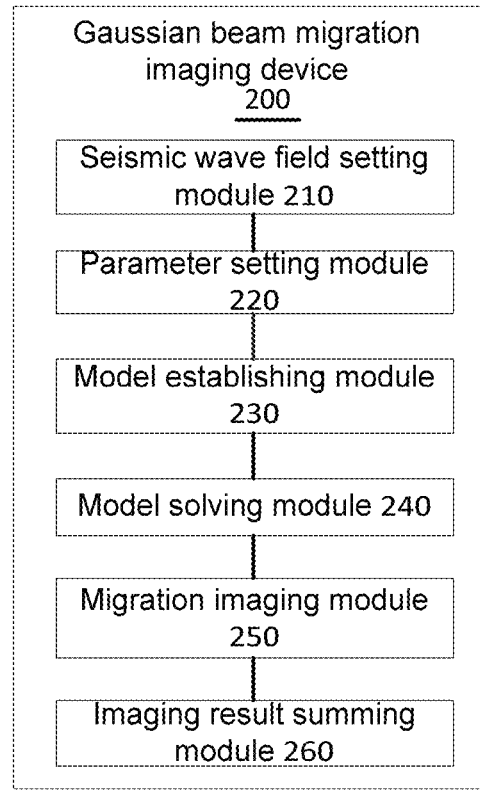
FIG. 9 shows a function block diagram of a Gaussian beam migration imaging device provided by an embodiment of the present invention.

An embodiment of the present invention provides a Gaussian beam migration imaging device 200. As shown in FIG. 9, the Gaussian beam migration imaging device 200 includes a seismic wave field setting module 210, a parameter setting module 220, a model establishing module 230, a model solving model 240 and a migration imaging module 250. The seismic wave field setting module 210 is configured to represent a seismic wave field of an earth surface in a form of superposition of Gaussian beams with a preset curvature parameter in time-space domain, where the representation of the seismic wave field of the earth surface including a waveform function and a time-space domain Gaussian beam based function. The parameter setting module 220 is configured to set a width of a Gaussian beam based function of the seismic wave field of the earth surface as a preset width, and set a spacing between centers of adjacent Gaussian beams of the seismic wave field of the earth surface as a preset spacing, so as to obtain a set seismic wave field of the earth surface. The model establishing model 230 is configured to establish, according to the set seismic wave field of the earth surface, a decomposition model for the seismic wave field of the earth surface. The model solving module 240 is configured to apply, based on seismic data and a medium velocity model, an optimization solution algorithm to the decomposition model for the seismic wave field of the earth surface, so as to obtain multiple waveform functions corresponding to the seismic data. The migration imaging module 250 is configured to propagate, based on the medium velocity model, Gaussian beams corresponding to the multiple waveform functions, and perform migration imaging to obtain migration imaging results.

Figure 10:
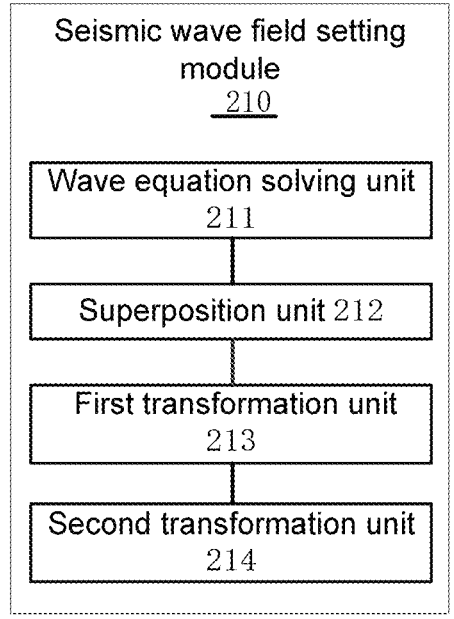
FIG. 10 shows a function block diagram of a seismic wave field setting module of the Gaussian beam migration imaging device provided by the embodiment of the present invention.

Referring to FIG. 10, the seismic wave field setting module 210 includes a wave equation solving unit 211, a superposition unit 212, a first transformation unit 213 and a second transformation unit 214. The wave equation solving unit 211 is configured to obtain, according to a two-dimensional seismic acoustic wave equation, an approximate solution of the two-dimensional seismic acoustic wave equation under an assumed high-frequency condition, the obtained approximate solution representing a Gaussian beam with a curvature parameter. The superposition unit 212 is configured to set the curvature parameter of the Gaussian beam with a curvature parameter of the earth surface as a preset curvature parameter, and superpose, by using spectrum functions with the preset curvature parameter as superposition factors, multiple Gaussian beams with the preset curvature parameter of the earth surface, with the multiple Gaussian beams having different parameters, so as to obtain a frequency domain seismic wave field of the earth surface represented in a form of superposition of the Gaussian beams with the preset curvature parameter. The first transformation unit 213 is configured to transform the Gaussian beams of the frequency domain seismic wave field of the earth surface into time domain Gaussian beam based functions, and transform the spectrum functions of the frequency domain seismic wave field of the earth surface into waveform functions, so as to obtain a time domain seismic wave field of the earth surface. The second transformation unit 214 is configured to transform the time domain Gaussian beam based functions of the time domain seismic wave field of the earth surface into time-space domain Gaussian beam based functions, so as to obtain a seismic wave field of the earth surface represented in a form of superposition of Gaussian beams with the preset curvature parameter in time-space domain.

The first transformation unit includes a first transformation subunit and a second transformation subunit. The first transformation subunit is configured to substitute a coordinate of a ray-centered coordinate system of the earth surface into the Gaussian beams of the frequency domain seismic wave field of the earth surface, so as to obtain the seismic wave field of the earth surface represented in a form of superposition of frequency domain Gaussian beam based functions. The second transformation subunit is configured to apply an inverse Fourier transform to the frequency domain Gaussian beam based functions, and apply the inverse Fourier transform to the spectrum functions, so as to obtain a time domain seismic wave field of the earth surface.

Figure 11:
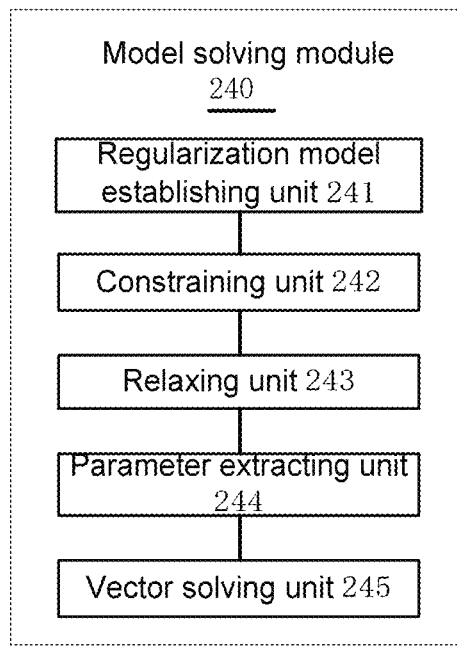
FIG. 11 shows a function block diagram of a model solving module of the Gaussian beam migration imaging device provided by the embodiment of the present invention.

Referring to FIG. 11, the model solving module 240 includes a regularization model establishing unit 214, a constraining unit 242, a relaxing unit 243, a parameter extracting unit 244 and a vector solving unit 245. The regularization model establishing unit 214 is configured to establish a Tikhonov regularization model, based on the decomposition model for the seismic wave field of the earth surface. The constraining unit 242 is configured to select, based on the Tikhonov regularization model, a bound term to establish an equality constraint minimization model. The relaxing unit 243 is configured to relax the equality constraint minimization model into an unconstrained minimization problem. The parameter extracting unit 244 is configured to extract time, inclinations and curvatures of seismic wavelets, by applying a polynomial radon transformation to several pieces of seismic trace data adjacent to the centers of the Gaussian beams. The vector solving unit 245 is configured to solve, with a gradient descent method, the unconstrained minimization problem based on the time, inclinations and curvatures of the seismic wavelets, so as to obtain a solution of a waveform vector, the solution of the waveform vector corresponding to multiple waveform functions.

Figure 12:
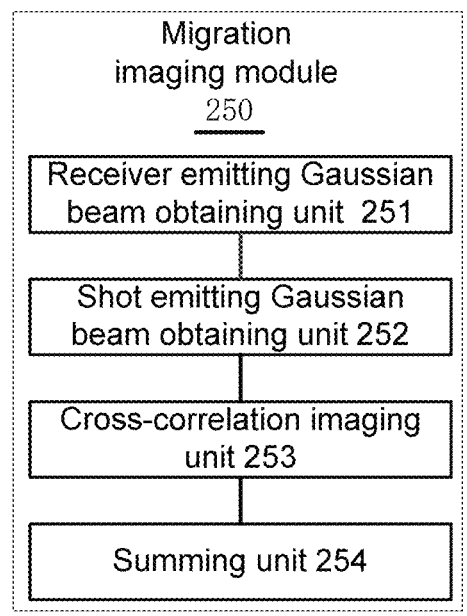
FIG. 12 shows a function block diagram of a migration imaging module of the Gaussian beam migration imaging device provided by the embodiment of the present invention.

Referring to FIG. 12, the migration imaging module 250 includes a receiver emitting Gaussian beam obtaining unit 251, a shot emitting Gaussian beam obtaining unit 252, a cross-correlation imaging unit 253 and a summing unit 254. The receiver emitting Gaussian beam obtaining unit 251 is configured to obtain, according to the multiple waveform functions, multiple receiver emitting Gaussian beams respectively corresponding to the multiple waveform functions. The shot emitting Gaussian beam obtaining unit 252 is configured to obtain, with a try-shooting method, multiple shot emitting Gaussian beams respectively corresponding to the multiple receiver emitting Gaussian beams. The cross-correlation imaging unit 253 is configured to perform cross-correlation imaging on each of the multiple receiver emitting Gaussian beams and a corresponding one of the multiple shot emitting Gaussian beams, so as to obtain migration imaging results of the multiple waveform functions. The summing unit 254 is configured to sum the migration imaging results of the multiple waveform functions to obtain a migration imaging result corresponding to the seismic data of one shot.

As shown in FIG. 9, the Gaussian beam migration imaging device 200 further includes an imaging result summing module 260. The imaging result summing module is configured to sum the migration imaging results of the seismic data of all shots within a predetermined exploration area, to obtain an imaging result of the predetermined exploration area.

To sum up, with the Gaussian beam migration imaging method and device provided by the embodiments of the present invention, the seismic wave field of the earth surface is represented in the form of superposition of Gaussian beams with a preset curvature parameter in time-space domain. Thereby, the width of the Gaussian beam based function can be set as a preset width, the spacing between centers of adjacent Gaussian beams can be set as a preset spacing, and the decomposition model for the seismic wave field of the earth surface can be established according to the set seismic wave field of the earth surface. Thus, the quantity of waveform functions obtained through solution on this model is reduced with respect to the existing methods, and thus the Gaussian beams required for migration imaging are reduced, which improves the computational efficiency of migration imaging.

It should be appreciated that the device and method disclosed in the embodiments provided in the present application may also be implemented in other ways. The embodiments of the device described above are only illustrative. For example, the flow charts and block diagrams in the drawings show the architectures, functions and operations possibly implemented by the device, method according to multiple embodiments of the present invention and computer program products. In this regard, each block in the flow charts or block diagrams may represent one module, a program segment or a part of codes, and the module, the program segment or the part of codes contains one or more executable instructions for implementing the specified logical functions. It shall also be noted that in some alternative implementations, the functions indicated by the blocks may also occur in an order other than that indicated in the drawings. For example, two consecutive blocks may actually be implemented in parallel, and sometimes they may be implemented in a reverse order, depending on the functions involved. It should also be noted that each block in the block diagrams and/or flow charts and a combination of the blocks in the block diagrams and/or flow charts may be implemented by a dedicated hardware-based system which executes the specified functions or actions, or may be implemented by a combination of a dedicated hardware and computer instructions.

In addition, the various function modules described in the various embodiments of the present invention may be integrated to form an independent part, or may exist in isolation, or two or more modules may be integrated to form an independent part.

The functions may be stored in a computer-readable storage medium, if they are implemented in a form of software function module and sold or used as individual products. Based on such understanding, the essence of the technical solution of the present invention, or a part thereof contributing to the prior art, or a part of the technical solution may be embodied in software products. Such computer software products are stored in a storage medium and contain several instructions for enabling a computer device (which may be a personal computer, a server, a network device or the like) to execute all or some of the steps of the method described in the various embodiments of the present invention. The aforementioned storage medium includes mediums capable of storing the program codes, such as USB disk, mobile hard disk, read-only memory (ROM), random access memory (RAM), diskette or optical disk. It should be noted that relational terms such as first, second and another herein are merely intended to distinguish an entity or operation from another entity or operation, rather than indicating or implying that there is a practical relation or sequence between such entities or operations. In addition, terms such as "comprise", "include" or any other variations thereof are intended to be inclusive rather than exclusive. Therefore, the process, method, article or device including a series of elements includes not only these elements, but also those not explicitly given, or also those inherent to such process, method, article or device. Without any further restrictions, the elements defined by a statement like "including a . . . " does not exclude the case where the process, method, article or device which includes such elements also includes other elements identical with such elements.

The above description is only illustrative of preferred embodiments of the present invention, and is not intended to limit the present invention. To those skilled in the art, various modifications, and variations may be made to the present invention. Any modifications, equivalent substitutions and improvements, made to the present invention within the spirit and principle of the present invention, shall be covered by the scope of protection of the present invention. It shall be noted that similar reference numbers and letters refer to similar items in the following drawings. Therefore, once an item has been defined in one drawing, it will not be further defined or explained in the subsequent drawings.

The above description is merely illustrative of the specific embodiments of the present invention, but the scope of protection of the invention is not limited thereto. Any other variations or substitutions, which would readily occur to those familiar with the technical field within the technical scope disclosed by the present invention, shall be covered by the scope of protection of the present invention. Therefore, the scope of protection of the present invention shall be determined by the claims.

The invention claimed is:

1. A Gaussian beam migration imaging method, comprising:
representing, by a computing device based on execution of instructions stored in a computer readable medium, a seismic wave field of an earth surface in a form of superposition of Gaussian beams with a preset curvature parameter in time-space domain, wherein the representation of the seismic wave field of the earth surface comprises a waveform function and a time-space domain Gaussian beam based function;
setting, by the computing device based on execution of the instructions stored in the computer readable medium, a width of a Gaussian beam based function of the seismic wave field of the earth surface as a preset width, and setting a spacing between centers of adjacent Gaussian beams of the seismic wave field of the earth surface as a preset spacing, so as to obtain a set seismic wave field of the earth surface;
establishing, by the computing device based on execution of the instructions stored in the computer readable medium and according to the set seismic wave field of the earth surface, a decomposition model for the seismic wave field of the earth surface; and
applying, by the computing device based on execution of the instructions stored in the computer readable medium and based on seismic data and a medium velocity model, an optimization solution algorithm to the decomposition model for the seismic wave field of the earth surface, so as to obtain a plurality of waveform functions corresponding to the seismic data; and
propagating, by the computing device based on execution of the instructions stored in the computer readable medium and based on the medium velocity model, Gaussian beams corresponding to the plurality of waveform functions, and performing migration imaging to obtain migration imaging results,
wherein the step of representing a seismic wave field of an earth surface in a form of superposition of Gaussian beams with a preset curvature parameter in time-space domain comprises:
obtaining, according to a two-dimensional seismic acoustic wave equation, an approximate solution of the two-dimensional seismic acoustic wave equation under an assumed high-frequency condition, the obtained approximate solution representing a Gaussian beam with a curvature parameter;
setting the curvature parameter of the Gaussian beam with a curvature parameter of an earth surface as a preset curvature parameter, and superposing, by using spectrum functions with the preset curvature parameter as superposition factors, a plurality of Gaussian beams with the preset curvature parameter of the earth surface with the plurality of Gaussian beams having different parameters, so as to obtain a frequency domain seismic wave field of the earth surface represented in a form of superposition of the Gaussian beams with the preset curvature parameter;
transforming the Gaussian beams of the frequency domain seismic wave field of the earth surface into time domain Gaussian beam based functions, and transforming the spectrum functions of the frequency domain seismic wave field of the earth surface into waveform functions, so as to obtain a time domain seismic wave field of the earth surface; and transforming the time domain Gaussian beam based functions of the time domain seismic wave field of the earth surface into time-space domain Gaussian beam based functions, so as to obtain the seismic wave field of the earth surface represented in a form of superposition of Gaussian beams with the preset curvature parameter in time-space domain.

2. The method according to claim 1, wherein the step of transforming the Gaussian beams of the frequency domain seismic wave field of the earth surface into time domain Gaussian beam based functions, and transforming the spectrum functions of the frequency domain seismic wave field of the earth surface into waveform functions, so as to obtain a time domain seismic wave field of the earth surface, comprises:
substituting a coordinate of a ray-centered coordinate system of the earth surface into the Gaussian beams of the frequency domain seismic wave field of the earth surface, so as to obtain the seismic wave field of the earth surface represented in a form of superposition of frequency domain Gaussian beam based functions; and
applying an inverse Fourier transform to the frequency domain Gaussian beam based functions, and applying the inverse Fourier transform to the spectrum functions, so as to obtain a time domain seismic wave field of the earth surface.

3. The method according to claim 1, wherein the step of applying based on seismic data and a medium velocity model an optimization solution algorithm to the decomposition model for the seismic wave field of the earth surface so as to obtain a plurality of waveform functions corresponding to the seismic data, comprises:
establishing a Tikhonov regularization model, based on the decomposition model for the seismic wave field of the earth surface;
selecting, based on the Tikhonov regularization model, a bound term to establish an equality constraint minimization model;
relaxing the equality constraint minimization model into an unconstrained minimization problem;
extracting time, inclinations and curvatures of seismic wavelets, by applying a polynomial radon transformation to several pieces of seismic trace data adjacent to the centers of the Gaussian beams; and solving, with a gradient descent method, the unconstrained minimization problem based on the time, inclinations and curvatures of the seismic wavelets, so as to obtain a solution of a waveform vector, the solution of the waveform vector corresponding to a plurality of waveform functions.

4. The method according to claim 1, wherein the step of propagating based on the medium velocity model Gaussian beams corresponding to the plurality of waveform functions and performing migration imaging to obtain migration imaging results, comprises:
   obtaining, according to the plurality of waveform functions, a plurality of receiver emitting Gaussian beams respectively corresponding to the plurality of waveform functions;
   obtaining, with a try-shooting method, a plurality of shot emitting Gaussian beams respectively corresponding to the plurality of receiver emitting Gaussian beams;
   performing cross-correlation imaging on each of the plurality of receiver emitting Gaussian beams and a corresponding one of the plurality of shot emitting Gaussian beams, so as to obtain migration imaging results of the plurality of waveform functions; and
   summing the migration imaging results of the plurality of waveform functions to obtain a migration imaging result corresponding to the seismic data of one shot.

5. The method according to claim 1, wherein the method further comprises summing the migration imaging results of the seismic data of all shots within a predetermined exploration area, to obtain an imaging result of the predetermined exploration area.

6. The method according to claim 1, wherein the preset width is $$\frac{3\pi V_a}{\omega_l},$$

the preset spacing is $$9\pi V_a \sqrt{\frac{1}{\omega_l \omega_h}},$$

where $\omega_l$ and $\omega_h$ are a minimum angular frequency and a maximum angular frequency of the seismic data, respectively, and $V_a$ is an average of the medium velocity model.

7. A Gaussian beam migration imaging device, comprising:
   a seismic wave field setting module comprising program instructions stored in a computer-readable medium and executable by a computing device and configured to represent a seismic wave field of an earth surface in a form of superposition of Gaussian beams with a preset curvature parameter in time-space domain, wherein the representation of the seismic wave field of the earth surface comprises a waveform function and a time-space domain Gaussian beam based function;
   a parameter setting module comprising program instructions stored in a computer-readable medium and executable by a computing device and configured to set a width of a Gaussian beam based function of the seismic wave field of the earth surface as a preset width, and set a spacing between centers of adjacent Gaussian beams of the seismic wave field of the earth surface as a preset spacing, so as to obtain a set seismic wave field of the earth surface;
   a model establishing module comprising program instructions stored in a computer-readable medium and executable by a computing device and configured to establish, according to the set seismic wave field of the earth surface, a decomposition model for the seismic wave field of the earth surface;
   a model solving module comprising program instructions stored in a computer-readable medium and executable by a computing device and configured to apply, based on seismic data and a medium velocity model, an optimization solution algorithm to the decomposition model for the seismic wave field of the earth surface, so as to obtain a plurality of waveform functions corresponding to the seismic data; and
   a migration imaging module comprising program instructions stored in a computer-readable medium and executable by a computing device and configured to propagate, based on the medium velocity model, Gaussian beams corresponding to the plurality of waveform functions, and perform migration imaging to obtain migration imaging results,
   wherein the seismic wave field setting module comprises a wave equation solving unit configured to obtain, according to a two-dimensional seismic acoustic wave equation, an approximate solution of the two-dimensional seismic acoustic wave equation under an assumed high-frequency condition, the obtained approximate solution representing a Gaussian beam with a curvature parameter;
   a superposition unit configured to set the curvature parameter of the Gaussian beam with a curvature parameter of an earth surface as a preset curvature parameter, and superpose, by using spectrum functions with the preset curvature parameter as superposition factors, a plurality of Gaussian beams with the preset curvature parameter of the earth surface, with the plurality of Gaussian beams having different parameters, so as to obtain a frequency domain seismic wave field of the earth surface represented in a form of superposition of the Gaussian beams with the preset curvature parameter;
   first transformation unit configured to transform the Gaussian beams of the frequency domain seismic wave field of the earth surface into time domain Gaussian beam based functions, and transform the spectrum functions of the frequency domain seismic wave field of the earth surface into waveform functions, so as to obtain a time domain seismic wave field of the earth surface; and
   a second transformation unit configured to transform the time domain Gaussian beam based functions of the time domain seismic wave field of the earth surface into time-space domain Gaussian beam based functions, so as to obtain the seismic wave field of the earth surface represented in a form of superposition of Gaussian beams with the preset curvature parameter in time-space domain.

8. The device according to claim 7, wherein the model solving module comprises:
   a regularization model establishing unit configured to establish a Tikhonov regularization model, based on the decomposition model for the seismic wave field of the earth surface;
   a constraining unit configured to select, based on the Tikhonov regularization model, a bound term to establish an equality constraint minimization model;

a relaxing unit configured to relax the equality constraint minimization model into an unconstrained minimization problem;
a parameter extracting unit configured to extract time, inclinations and curvatures of seismic wavelets, by applying a polynomial radon transformation to several pieces of seismic trace data adjacent to the centers of the Gaussian beams; and
a vector solving unit configured to solve, with a gradient descent method, the unconstrained minimization problem based on the time, inclinations and curvatures of the seismic wavelets, so as to obtain a solution of a waveform vector, the solution of the waveform vector corresponding to a plurality of waveform functions.

* * * * *